US008861458B2

(12) United States Patent
Dai et al.

(10) Patent No.: US 8,861,458 B2
(45) Date of Patent: Oct. 14, 2014

(54) METHOD AND APPARATUS FOR SCHEDULING UPLINK RADIO RESOURCES IN RADIO COMMUNICATION SYSTEM

(75) Inventors: Qian Dai, Shenzhen (CN); Guanzhou Wang, Shenzhen (CN); Si Chen, Shenzhen (CN); Tao Wang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 339 days.

(21) Appl. No.: 13/322,228

(22) PCT Filed: May 21, 2010

(86) PCT No.: PCT/CN2010/073089
§ 371 (c)(1),
(2), (4) Date: Nov. 23, 2011

(87) PCT Pub. No.: WO2010/135971
PCT Pub. Date: Dec. 2, 2010

(65) Prior Publication Data
US 2012/0076103 A1 Mar. 29, 2012

(30) Foreign Application Priority Data

May 26, 2009 (CN) .......................... 2009 1 0085630

(51) Int. Cl.
*H04W 72/12* (2009.01)
*H04W 72/08* (2009.01)
*H04L 1/00* (2006.01)

(52) U.S. Cl.
CPC .............. *H04L 1/00* (2013.01); *H04W 72/085* (2013.01); *H04W 72/1268* (2013.01); *H04W 72/1289* (2013.01)
USPC ........................................................ 370/329

(58) Field of Classification Search
CPC ................... H04W 72/1278; H04W 72/1289; H04W 72/10; H04W 72/042; H04W 72/08; H04W 72/085
See application file for complete search history.

(56) References Cited

U.S. PATENT DOCUMENTS 8,416,881 B1 * 4/2013 Jia et al. ...................... 375/296
8,576,775 B2 * 11/2013 Jia et al. ...................... 370/328
(Continued)

FOREIGN PATENT DOCUMENTS

CN        1756228 A        4/2006
CN      101127719 A        2/2008
(Continued)

OTHER PUBLICATIONS

International Search Report for PCT/CN2010/073089, English Translation attached to original, Both Completed by the Chinese Patent Office on Aug. 19, 2010, 10 Pages all together.

(Continued)

Primary Examiner — Min Jung
(74) Attorney, Agent, or Firm — Brooks Kushman P.C.

(57) ABSTRACT

A method and an apparatus for scheduling uplink radio resources in a wireless communication system, and the method comprises: an evolved NodeB (eNB) allocating radio resources to user equipment (UE) according to the uplink channel quality information and the current logical channel information of the UE, determining the control signaling information of the radio resources, and notifying the control signaling information of the radio resources to the UE; Alternatively, after receiving the control signaling information of the radio resources sent by the eNB, the UE selecting corresponding radio resources for the logical channel according to the requirements of quality of service (QoS) of the logical channel and the control signaling information of the radio resources.

22 Claims, 6 Drawing Sheets

(56) References Cited

U.S. PATENT DOCUMENTS

| | | |
|---|---|---|
| 2007/0140261 A1 | 6/2007 | Wang et al. |
| 2008/0287155 A1 | 11/2008 | Xu et al. |
| 2010/0208687 A1* | 8/2010 | Lim et al. .................. 370/329 |
| 2010/0265862 A1* | 10/2010 | Choi et al. ................. 370/311 |
| 2010/0296472 A1* | 11/2010 | Lee et al. .................. 370/329 |
| 2012/0093000 A1* | 4/2012 | Jeong et al. ............... 370/241 |

FOREIGN PATENT DOCUMENTS

| | | |
|---|---|---|
| EP | 1986455 | 10/2008 |
| EP | 2129151 | 12/2009 |
| WO | 2008041089 A2 | 4/2008 |
| WO | 2008108228 | 9/2008 |

OTHER PUBLICATIONS

Erik Dahlman et al., 3G Evolution, HSPA and LTE for Mobile Broadband, Academic Press, 2007.

3GPP TS 36.321 3rd Generation Partnership Project; Technical Specification Group Radio Access Network; Evolved Universal Terrestrial Radio Access (E-UTRA) Medium Access Control (MAC) Protocol Specification (Release 8) V8.1.0 (Mar. 2008).

Search Report for EP 10780052.6, Completed by the European Patent Office, Dated Nov. 29, 2013, 6 Pages.

* cited by examiner

METHOD AND APPARATUS FOR SCHEDULING UPLINK RADIO RESOURCES IN RADIO COMMUNICATION SYSTEM

CROSS-REFERENCE TO RELATED APPLICATION

This application is the U.S. national phase of PCT Appln. No. PCT/CN2010/073089 filed May 21, 2010 which claims priority to Chinese Application No. 200910085630.2 filed May 26, 2009, the disclosures of which are incorporated in their entirety by reference herein.

TECHNICAL FIELD

The present invention relates to uplink radio resource scheduling technology in mobile communication systems, and more especially, to a method and apparatus for scheduling uplink radio resources based on the carrier aggregation technology in the Long Term Evolution-Advanced (LTE-A) system.

BACKGROUND OF THE RELATED ART

In the Evolved Universal Terrestrial Radio Access Network (E-UTRAN) in the third generation mobile communication Long Term Evolution (LTE) system, the uplink data is transmitted through the uplink shared channel. The Evolved NodeB (eNB) allocates resources to each User Equipment (UE). The access technology applied by the E-UTRAN is orthogonal frequency division multiplexing (OFDM) technology, and compared with the second generation mobile communication system, the radio resource management of the E-UTRAN system has features such as large bandwidth and multiple time processes, and its radio resources have two-dimensional attributes of time and frequency, thus the number of users born in the resources significantly increases.

In order to allocate resources and provide service for each UE in accordance with its own need so as to achieve better multiplexing performance in the uplink transmission, and also in order to fully flexibly and effectively use the system bandwidth, the LTE system formulates a dedicated control message for the allocation of the user's uplink transmission resource. Wherein, the control message dedicated to allocating the resources in the Physical Uplink Shared Channel (PUSCH) is sent by the eNB to the UE, and the resource allocation control message is also called UpLink Grant (UL Grant), and the UL Grant is sent in the Physical Downlink Control Channel (PDCCH), and the Downlink Control information format 0 (DCI format 0) is applied to send.

The basic process of uplink radio resource scheduling is that: the eNB judges which frequency resources are transmitted appropriately to the UE according to the radio channel conditions of uplink of the target UE, and indicates the frequency positions of the radio resources in the aforementioned control signaling, and distributes the control signaling to the UE, and after the UE receives the control signaling and demodulates out the resource information, thus it acquires the scheduling of the frequency resources of the UE by the eNB, and upload the service data in the designated frequency resource positions.

In the LTE protocol, a part of important definition domains included in the DCI format 0 are as follows:

Frequency hopping indicator: used to indicate whether the frequency resources assigned by the signaling use the frequency-hopping mode or not;

Resource block assignment information: used to indicate the positions and sizes of the frequency resources used by the UE;

Modulation and Coding Scheme (MCS): used to indicate which modulation mode and coding rate should be applied in the data transmitted by the UE;

New data indicator: used to indicate the UE whether to send new data or retransmit old data;

Wherein, the resource block assignment information is the definition domains used by the foregoing eNB to notify UE which frequency resources can be used to bear the uplink data.

In the current LTE protocol, only the "resource block assignment information" and "modulation and coding scheme" in the signaling information acquired by UE from the eNB are used to determine how to allocate the uplink data to which frequency resources.

In addition, the Radio Resource Control (RRC) layer in the LTE system sends a RRC message to establish a RRC layer link between the UE and the eNB, to configure system parameters and to transfer UE capability parameters and so on. Wherein, the downlink RRC message is transmitted on the Physical Downlink shared Channel (PDSCH).

The current LTE system supports multiple types of communication services, such as Voice over Internet Protocol (VoIP) services, file transfer protocol (FTP) data services, Hypertext Transfer Protocol (HTTP) Internet services and online game services and so on. The quality of service (QoS) parameters required by these services are different, and at present, the QOS parameters mainly comprise the maximum allowable packet delay, the minimum allowable data rate, the maximum allowable packet error rate, Prioritized Bit Rate (PRB), the Aggregate Maximum Bit Rate (AMBR) and so on. In the media access control (MAC) layer of the UE, different types of service data are mapped to multiple logical channels (LCH), and according to different QoS of the services, they are divided into four logical channel groups (LCG) respectively according to the priority of the logical channels, then the UE reports the data amount of these four LCGs to the eNB in the form of Buffer Status Report (BSR), and the eNB allocates frequency resources to the UE after comprehensively considering the uplink channel quality of the UE, BSR, the QoS requirement of each service in the UE.

The uplink in the existing LTE system Release 8 uses the transmission technology of the Single Carrier-Frequency Division Multiple Access (SC-FDMA), which has the limitation that the frequency resources assigned for the UE must be continuous when the eNB carries out the uplink frequency resources scheduling. After the UE receives the assignment signaling of frequency resources, if the UE has the data of multiple LCHs (which means the UE starts up multiple types of services), the UE allocates the resources to each logical channel according to the following steps:

allocate the radio resources to logical channels that have data to transmit while the average data flow does not satisfy the PRB requirements of the logical channels according to the descending order of the priorities of the logical channels;

If there are remaining resources, allocate the remaining resources in turn to the logical channels that have data to transmit according to the descending order of the priorities of the logical channels. The logical channels with the same priority enjoy the equal opportunities to allocate radio resources.

Moreover, the UE should follows the following principles when executing the abovementioned steps:

when one Radio Link Control Service Data Unit (RLC SDU) in the LCH data to be transmitted can be completely born in the remaining resources, the UE should not segment the RLC SDU to transmit (that is, it should not only allocate resources for a part of data of the SDU in this resource allocation);

if the UE segments one RLC SDU, it should use the remaining resources to bear a segment of data in the RLC SDU as large as possible;

the UE should maximize the amount of data transmission.

Wherein, the principle for formulating the LCH priorities are different according to different requirements of operators, for example in some cells, the operators might require that the VoIP service should have the highest priority, while in other cells, operators might require that the internet services should have the highest priority. When the UE starts up multiple types of services, in order to ensure QoS requirements of various services are satisfied, the eNB must select the appropriate frequency resources in accordance with the requirement of the service that is most strict in QoS, which in fact wastes a certain quantity of frequency resources since the maximum packet error rates (PER) required by different types of services are different, so as the channel quality of the required frequency resources, and if the UE places the data of services with low requirements of channel quality in the frequency resources of high quality, the resources are wasted.

In the principle defined in the current LTE system on how the UE places the logical channel data into the frequency resources (refer to the above description), it lacks the principle of "select the appropriate logical channel data and put it into the frequency resources according to the difference of channel quality", thus the UE only allocates the resources stiffly to the logical channel data with the highest priority.

For the current LTE system, since the resources bearing the UL grant are limited, although the PUSCH resource utilization can be improved if more control information is added in the UL grant for the uplink scheduling, it will bring larger control signaling overhead, which will cancel most of the SCH-channel transmission gain. In addition, although the existing RRC message can be utilized or a new MAC control element (MAC CE) can be added to bear a part of control information, they also have the problem that the control information overhead will be increased. Therefore, although the current uplink scheduling mechanism in the LTE system has shortcomings, the performance is still acceptable.

According to the definition in the protocol standards of the current LTE MAC layer (3Gpp TS36.321), the foregoing MAC control unit is a part of the MAC layer protocol data unit (MAC PDU), and one MAC PDU is composed of one MAC header, zero or more MAC control units, zero or more MAC Service Data Units (SDU) and optional padding data.

Since the formulation of the LTE release 8 standards is close to completion, in order to adapt to the current and future rapid growth in demand for various radio services, the next evolution standard of the LTE release 8, which is LTE-Advanced standard, has already entered into the formulation process.

The LTE-Advanced system uses the carrier aggregation technology, and the carriers participating in the aggregation are called component carriers, the UE can simultaneously carry out transmission and reception with the eNB in multiple carrier frequency bands, and in a single carrier frequency band, the LTE release8 features still remain, that is, the LTE-Advanced system can be seen as the "binding" of multiple LTE systems. After introducing the carrier aggregation technology, the available resources in the LTE-Advanced systems are greatly expanded, and the flexibility of uplink scheduling is improved greatly. In the LTE system, the eNB can only allocate continuous frequency spectrum resources to the UE in the frequency domain, thus the scheduling flexibility is considerably limited, and after multiple component carriers are aggregated, the eNB can allocate resources to the UE in each component carrier frequency band, which is equivalent to introducing the feature of distributed scheduling in frequency domain, thus both the scheduling flexibility and the frequency domain diversity gain improve significantly. For example, the eNB might schedule different service data in different component carrier frequency bands, and the channel conditions of different component carrier frequency bands are different (different frequencies will lead to different channel conditions such as fast fading, slow fading, Doppler shift and so on), and the eNB allocates the component carrier resource whose channel quality is just right to the corresponding service according to the QoS requirements of different types of services, thus there is no chance that the service with low requirements of channel quality actually obtains frequency resource of high channel quality while the data of the service with high requirements of channel quality cannot obtain the best frequency resources, and the communication quality of this service will be affected and the system throughput is decreased.

Although the eNB can flexibly schedule the resources after the carrier aggregation technology is introduced, at present, the information directly related to resource allocation in the resource assignment control signaling sent by the eNB to the UE is only the resource block assignment information and the MCS, from which the UE cannot determine that the eNB hopes to allocate the resources of which component carrier to which logical channel. According to the UE handling mechanism defined in the current LTE release 8 standard, the UE only allocate the resources of the first component carrier assigned by the eNB to the logical channel with the highest priority, and then allocate the resources of the second component carrier until the resources of the first component carrier have been allocated. This indicates that the scheduling intention of the eNB is not executed by the UE at all, which will decrease the system throughput.

In the LTE system, since the uplink resources are limited and the uplink scheduling is not so flexible, for the method that the UE side uses a simple logical channel priority handling mechanism to use the resources assigned by the eNB, the performance is acceptable. However, in the LTE-Advanced system, since the carrier aggregation technology provides large uplink scheduling flexibility and largely expends the system overall bandwidth, the performance loss caused by the aforementioned shortcomings is very big in the LTE-Advanced systems.

SUMMARY OF THE INVENTION

In view of this, the main purpose of the present invention is to provide a method and apparatus for scheduling uplink radio resources in a wireless communication system to significantly save the uplink radio resources and improve the overall throughput of the system.

To achieve the aforementioned purpose, the technical scheme of the present invention is implemented as follows:

A method for scheduling uplink radio resources in a wireless communication system, the method comprises:

an evolved NodeB (eNB) allocating radio resources to user equipment (UE), and determining control signaling information for the radio resources, and notifying the control signaling information of said radio resources to the UE.

Preferably, the control signaling information of the radio resources comprises at least one of types of following information: parameter information related to quality of service of data born in the radio resources, parameter information related to quality of an uplink channel in which the radio resources are located, and parameter information related to a logical channel of the UE corresponding to the radio resources.

Preferably, the parameter information related to the quality of service of the data born in the radio resources comprises: at least one of types of packet error rate information, block error rate information and bit error rate information;

the parameter information related to the quality of the uplink channel in which the radio resources are located comprises at least one of types of signal to interference noise ratio information and signal to noise ratio information; the parameter information related to the logical channel of the UE corresponding to the radio resources comprises at least one of types of logical channel sequence number information, logical channel group sequence number information, logical channel priority information, logical channel aggregate maximum bit rate information, logical channel prioritized rate information and logical channel maximum allowable delay information.

Preferably, the step of notifying the control signaling information of the radio resources to the UE specifically is:

bearing the control signaling information of said radio resources in an uplink grant message, or a radio resource control (RRC) message, or a dedicated media access control (MAC) control unit, and sending the information to the UE.

Preferably, the step of notifying the control signaling information of the radio resources to the UE specifically is:

setting identification information of the control signaling information of the radio resources, and sending said identification information to the UE.

Preferably, the step of notifying the control signaling information of the radio resources to the UE specifically is:

setting a corresponding relationship between the control signaling information of said radio resources and the information in the uplink grant message, or the RRC message, or the dedicated MAC control unit, sending the corresponding relationship to the UE or storing the corresponding relationship in the eNB and the UE in advance.

A method for scheduling uplink radio resources in a wireless communication system, the method comprises:

after receiving control signaling information of radio resources sent by the eNB, the UE selects corresponding radio resources for a logical channel according to requirements of quality of service of the logical channel and the control signaling information of the radio resources, and said radio resources are allocated to the UE by the eNB.

Preferably, a principle which the UE selecting the corresponding radio resources for the logical channel is based on is:

allocating the radio resources of component carriers with higher Modulation and Coding Scheme (MCS) to the logical channel having higher requirements of index of packet error rate/block error rate/bit error rate.

Preferably, when the control signaling information of the radio resources sent by the eNB comprises information of the packet error rate/block error rate/bit error rate or level thereof, the principle which selecting the corresponding radio resources for the logical channel is based on is:

allocating said radio resources to the logical channel according to the packet error rate/the block error rate/the bit error rate of the radio resources or the packet error rate/block error rate/bit error rate range corresponding to the packet error rate/block error rate/bit error rate level, and the maximum allowable packet error rate/block error rate/bit error rate of the logical channel being equal or close to the packet error rate/block error rate/bit error rate required by the radio resources allocated by the eNB;

alternatively, the maximum allowable packet error rate/block error rate/bit error rate of the logical channel being close to or belonging to the packet error rate/block error rate/bit error rate range required by the radio resources allocated by the eNB.

Preferably, when the control signaling information of the radio resources sent by the eNB comprises information of a signal to noise ratio or signal to noise ratio level or signal to interference noise ratio or signal to interference noise ratio level, the principle which selecting the corresponding radio resources for the logical channel is based on is:

allocating the radio resources of component carriers having the higher signal to noise ratio or signal to interference noise ratio to the logical channel having higher requirements of the index of packet error rate/block error rate/bit error rate;

alternatively, allocating the radio resources of component carriers having the higher signal to noise ratio level or signal to interference noise ratio level to the logical channel having higher requirements of the index of packet error rate/block error rate/bit error rate.

Preferably, when the control signaling information of the radio resources sent by the eNB comprises logical channel identification information, the principle which selecting the corresponding radio resources for the logical channel is based on is:

allocating the radio resources to a corresponding logical channel which has data to be transmitted and whose average data flow does not meet a prioritized bit rate (PRB) requirement of this logical channel according to the logical channel identification information corresponding to the radio resources; wherein, the logical channel identification information comprises at least one of types of the logical channel sequence number information and the logical channel group sequence number information;

when the radio resources in a same component carrier are assigned by the eNB to at least two logical channels, allocating the radio resources in turn to logical channels whose average data flow does not meet the PRB requirements of the logical channels in accordance with a descending order of priorities of these logical channels;

when there are remaining resources, the remaining resources being allocated in turn to logical channels having data to be transmitted according to the descending order of the priorities of the logical channels, and logical channels with a same priority enjoying equal opportunities to acquire the radio resources.

Preferably, when the control signaling information of the radio resources sent by the eNB comprises an uplink channel quality detection result, the principle which selecting the corresponding radio resources for the logical channel is based on is:

allocating the radio resources of component carriers having better channel quality to the logical channel having higher requirements of index of packet error rate/block error rate/bit error rate.

Preferably, when the control signaling information of the radio resources sent by the eNB comprises the logical channel priority information, the principle which selecting the corresponding radio resources for the logical channel is based on is:

according to the logical channel priority information corresponding to the radio resources, allocating the radio resources to a logical channel whose priority is equal or closest to a logical channel priority corresponding to the radio resources.

An apparatus for scheduling uplink radio resources in a wireless communication system, said apparatus comprises a resource allocation unit, a determination unit and a notification unit; wherein the resource allocation unit is used to allocate radio resources to the UE;

the determination unit is used to determine control signaling information of the radio resources;

the notification unit is used to notify the control signaling information of the radio resources to the UE.

Preferably, said notification unit further comprises a bearing module and a transmitting module; wherein, the bearing module is used to bear the control signaling information of said radio resources in an uplink grant message, or a RRC message, or a dedicated MAC control unit;

the transmitting module is used to transmit the control signaling information of the radio resources to said UE.

Preferably, said notification unit further comprises a setting module and a transmitting module; wherein, the setting module is used to set identification information of the control signaling information of the radio resources;

the transmitting module is used to transmit the identification information to the UE.

Preferably, said notification unit further comprises a setting module and a notification module; wherein, the setting module is used to set a corresponding relationship between information in the uplink grant message or the RRC message or the dedicated MAC control unit and the control signaling information of the radio resources;

the notification module is used to send the corresponding relationship to the UE or configure the corresponding relationship into the eNB and the UE in advance.

An apparatus for scheduling uplink radio resources in a wireless communication system, said apparatus comprises a receiving unit and a selecting unit, wherein, the receiving unit is used to receive control signaling information of radio resources sent by the eNB, and said radio resources are allocated by the eNB to the UE;

the selecting unit is used to select corresponding radio resources for the logical channel according to quality of service requirements of the logical channel and the control signaling information of the radio resources.

Preferably, a principle which selecting the corresponding radio resources for the logical channel is based on is:

allocating the radio resources of component carriers having higher MCS to the logical channel having higher requirements of index of packet error rate/block error rate/bit error rate.

Preferably, when the control signaling information of the radio resources received by the receiving unit comprises information of the packet error rate/block error rate/bit error rate or level thereof, the principle which selecting the corresponding radio resources for the logical channel is based on is:

allocating said radio resources to the logical channel according to the packet error rate/block error rate/bit error rate of the radio resources or a packet error rate/block error rate/bit error rate range corresponding to a packet error rate/block error rate/bit error rate level, and a maximum allowable packet error rate/block error rate/bit error rate of the logical channel being equal or close to the packet error rate/block error rate/bit error rate required by the radio resources allocated by the eNB; alternatively, the maximum allowable packet error rate/block error rate/bit error rate of the logical channel being close to or belonging to the packet error rate/block error rate/bit error rate range required by the radio resources allocated by the eNB.

Preferably, when the control signaling information of the radio resources received by the receiving unit comprises information of a signal to noise ratio or signal to noise ratio level or signal to interference noise ratio or signal to interference noise ratio level, the principle which selecting the corresponding radio resources for the logical channel is based on is:

allocating the radio resources of the component carriers having a higher signal to noise ratio or signal to interference noise ratio to the logical channel having higher requirements of index of packet error rate/block error rate/bit error rate;

alternatively, allocating the radio resources of the component carriers having a higher signal to noise ratio level or signal to interference noise ratio level to the logical channel having higher requirements of index of packet error rate/block error rate/bit error rate.

Preferably, when the control signaling information of the radio resources received by the receiving unit comprises logical channel identification information, the principle which selecting the corresponding radio resources for the logical channel is based on is:

allocating the radio resources to a corresponding logical channel which has data to be transmitted and whose average data flow does not meet a prioritized bit rate (PRB) requirement of this logical channel according to the logical channel identification information corresponding to the radio resources; wherein, the logical channel identification information comprises at least one of types of the logical channel sequence number information and the logical channel group sequence number information;

when the radio resources in the same component carrier are assigned by the eNB to at least two logical channels, allocating the radio resources in turn to logical channels whose average data flow does not meet the PRB requirements of the logical channel in accordance with a descending order of priorities of these logical channels;

when there are remaining resources, the remaining resources being allocated in turn to logical channels having data to be transmitted according to the descending order of the priorities of the logical channels, and logical channels with the same priority enjoying equal opportunities to acquire radio resources.

Preferably, when the control signaling information of the radio resources received by the receiving unit comprises an uplink channel quality detection result, the principle which selecting the corresponding radio resources for the logical channel is based on is:

allocating the radio resources of component carriers having better channel quality to the logical channel having higher requirements of index of packet error rate/block error rate/bit error rate.

Preferably, when the control signaling information of the radio resources received by the receiving unit comprises logical channel priority information, the principle which selecting the corresponding radio resources for the logical channel is based on is:

according to the logical channel priority information corresponding to the radio resources, allocating the radio resources to a logical channel whose priority is equal or closest to a logical channel priority corresponding to the radio resources.

In the present invention, the eNB allocates uplink radio resources to the UE according to uplink channel quality information and the current logical channel information of the UE, and after the radio resources have been allocated, the control information of the radio resources is sent to guide the UE executing the radio resource scheduling, since it fully refers to the radio resource control information determined by the eNB, the radio resources allocated by the UE to the logical channel can better meet the QoS of this logical channel, and resources will not be wasted, moreover, the radio resources allocated by the UE to the logical channel can better meet the resource allocation requirements of the eNB. The present invention greatly improves the cooperation degree of the UE for the radio resources scheduling strategy of the eNB and increases system throughput and capacity to the most extent under the condition that the basic QoS is satisfied.

PREFERRED EMBODIMENTS OF THE PRESENT INVENTION

Figure 1:
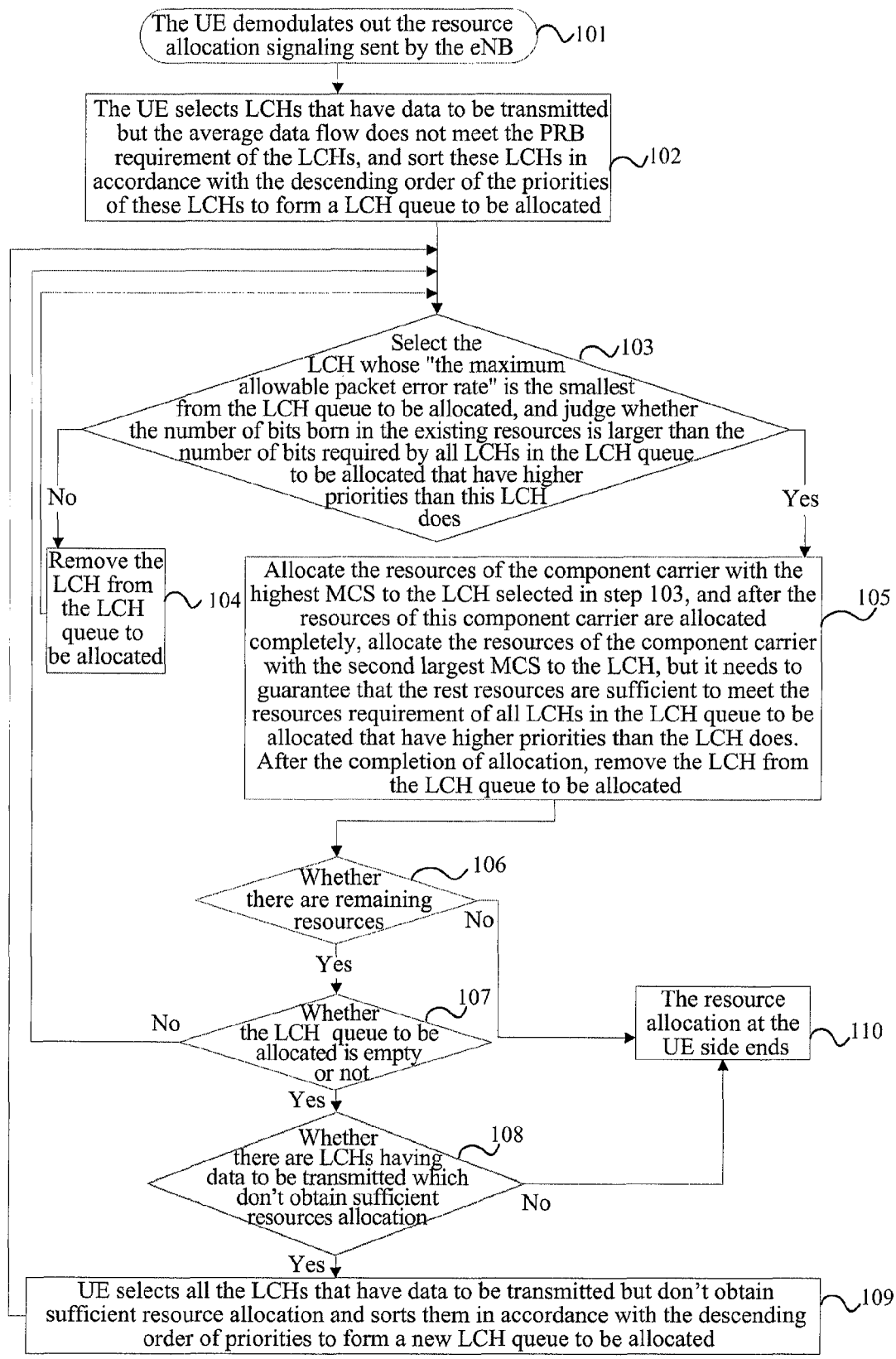
FIG. 1 is a flow chart of the first example of method for scheduling uplink radio resources in the wireless communication system in accordance with the present invention.

The basic idea of the present invention is that: the eNB allocates uplink radio resources to the UE according to the uplink channel quality information and the current logical channel information of the UE, and after the radio resources have been allocated, the control information of the radio resources is sent to guide the UE executing the radio resource scheduling, and since it fully refers to the radio resource control information determined by the eNB, the radio resources allocated by the UE to the logical channel can better meet the QoS of this logical channel, and resources will not be wasted, moreover, the radio resources allocated by the UE to the logical channel can better meet the resource allocation requirements of the eNB. The present invention greatly improves the cooperation degree of the UE for the radio resources scheduling strategy of the eNB and increases system throughput and capacity to the most extent under the condition that the basic QoS is satisfied.

To make the purpose, technical scheme and advantages of the present invention clearer, the present invention will be described in further detail in combination with the examples and the accompanying figures below.

The First Example

The eNB allocates radio resources to the UE according to the uplink channel quality information and the current logical channel information of the UE, and determines the control signaling information for the allocated radio resources, and notifies the control signaling information of the radio resources to the UE. The process of logical channel priority processing in the UE side is executed by the following steps:

allocate the radio resources in turn to a logical channel which has data to be transmitted and whose average data flow does not meet the prioritized bit rate (PRB) requirement of this logical channel according to the descending order of the priorities of the logical channels;

if there are remaining resources, the remaining resources are allocated in turn to logical channels having data to be transmitted according to the descending order of the priorities of the logical channels, and logical channels with the same priority have equal opportunities to acquire radio resources.

The principles which should be obeyed when executing the abovementioned steps are that:

allocate the radio resources of the component carrier having higher MCS to a logical channel having higher requirements of index of the packet error rate/block error rate/bit error rate.

When one RLC SDU in the LCH data to be transmitted can be born completely in the remaining resources, the UE should not segment the RLC SDU to transmit (that is, do not only allocate resources to a part of data of the SDU in this resource allocation);

if the UE segments one RLC SDU, it should utilize the remaining resources to bear a segment of data in the RLC SDU as large as possible;

the UE should maximize the amount of data transmission.

In this example, one processing principle is added for the process of logical channel priority processing in the UE side, and since there is a certain correlation between the MCS level and the channel conditions, from the common sense, higher MCS level represents better channel conditions of this frequency band resources, thus the MCS level can be used as one item of reference information to guide the UE allocating appropriate resources according to QoS specification. The technical scheme of the first example will be further illustrated in combination with a specific example.

FIG. 1 is a flow chart of the first example of method for scheduling uplink radio resources in a wireless communication system in accordance with the present invention, and assume that in a certain scheduling, the uplink radio resources and their control signaling information content allocated by the eNB to the UE are: in the component carrier 1, allocate four resource blocks (RB), MCS=21; in the component carrier 2, allocate the resources of 8 RBs, MCS=10.

Assuming there are two LCH data at the UE side to be transmitted, wherein LCH1 is VoIP service data, and LCH2 is FTP service data, and the LCH1 priority>the LCH2 priority, and the maximum allowable packet error rate of the LCH1>the maximum allowable packet error rate of the LCH2. The data to be transmitted in the LCH1 is 320 bit, while the data to be transmitted in the LCH2 is 3 Mbit. According to the definition in the LTE standard (3GPP TS36.213), the aforementioned scenario setting can be acquired by looking up tables (Table 8.6.1-1 and Table 7.1.7.2.1-1 in TS36.213): the resources of the component carrier 1 allocated by the eNB to the UE can bear 1736 bit data; and the resources of the component carrier 2 can bear 1384 bit data. As shown in FIG. 1, in this example, the method for scheduling uplink radio resources in the wireless communication system in this example comprises the following steps:

Step 101: the UE demodulates out the resource allocation signaling sent by the eNB;

Step 102: the UE selects LCHs that have data to be transmitted but the average data flow does not meet the PRB requirements of the LCHs, and sort these LCHs in accordance with the descending order of the priorities of these LCHs to form a LCH queue to be allocated;

Step 103: select the LCH whose "the maximum allowable packet error rate" is the smallest from the LCH queue to be allocated, and judge whether the number of bits born in the existing resources is larger than the number of bits required by all LCHs that have higher priorities than this LCH does in the LCH queue to be allocated, and if yes, it means that there are extra resources that can be allocated to the LCH, and proceed to step 105; otherwise, there are no extra resources to be allocated to the LCH, proceed to step 104. In accordance with the scenario data set in this example, the LCH whose "the maximum allowable packet error rate" is the smallest is the LCH2, and the number of bits to be transmitted in all LCHs that have higher priorities than the LCH2 is 320 bit, and the existing resources can bear 3120 bit, 3120−320>0, thus execute step 105.

Step 104: since there are no extra resources to be allocated to the LCH selected in step 103, the UE does not allocate resources to the LCH in this resources allocation and remove the LCH from the LCH queue to be allocated, and return to step 103;

Step 105: allocate the resources of the component carrier with the highest MCS to the LCH selected in step 103, and after the resources of this component carrier have been allocated completely, allocate the resources of the component carrier with the second largest MCS to the LCH, but it needs to guarantee that the remaining resources are sufficient to meet the resource requirements of all LCHs that have higher priorities than the LCH does in the LCH queue to be allocated. After the completion of allocation, remove the LCH from the LCH queue to be allocated; in accordance with the scenario data set in this example, the resources of the component carrier 1 has the largest MCS, thus its resources will be allocated to the LCH2, and since the data to be transmitted in the LCH2 is 3 Mbit which is larger than the resource bearing capacity of the carrier 1, the resources of the component carrier 2 should also be allocated to the LCH2. Moreover, since it needs to guarantee that the resource requirements of the LCH1 with high priority are met, only 1384−320=1064 bit in the resources of the carrier 2 are allocated to LCH2, and a total of 1736+1064=2800 bit of resources are allocated to the LCH2.

Step 106: judge whether there are remaining resources allocated by the eNB; if yes, proceed to step 107; otherwise, the resource allocation at the UE side ends. In accordance with scenario data set in this example, there is no remaining resources allocated by eNB, so step 110 is executed, and the allocation of resources at the UE side ends.

Step 107: judge whether the LCH queue to be allocated is empty or not, and if no, return to step 103; otherwise, proceed to step 108;

Step 108: judge whether there are the LCHs that have data to be transmitted and don't obtain sufficient resources allocation, and if no, proceed to step 109; otherwise, the resource allocation at the UE side ends;

Step 109: if there are LCHs that have data to be transmitted at the UE side but don't obtain sufficient resources allocation, select these LCHs and sort them in accordance with the descending order of priorities to form a new LCH queue to be allocated, and return to Step 103;

Step 110: the resource allocation at the UE side ends.

The Second Example

The eNB allocates radio resources to the UE according to the uplink channel quality information and the current logical channel information of the UE, and determines the control signaling information for the allocated radio resources, and notifies the control signaling information of the radio resources to the UE. If the control signaling information of the radio resources comprises the packet error rate/block error rate/bit error rate or level information thereof, the process of logical channel priority processing at the UE side is executed by the following steps:

allocate the radio resources in turn to logical channels which have data to be transmitted and whose average data flow does not meet the PRB requirements of these logical channels according to the descending order of the priorities of the logical channels;

when there are remaining resources, the remaining resources are allocated in turn to logical channels having data to be transmitted according to the descending order of the priorities of the logical channels while logical channels with the same priority have equal opportunities to acquire radio resources.

The principles which should be obeyed when executing the abovementioned steps comprise that:

allocate said radio resources to the logical channel according to the packet error rate/block error rate/bit error rate of the radio resources or the packet error rate/block error rate/bit error rate range corresponding to the packet error rate/the block error rate/the bit error rate level, and the maximum allowable packet error rate/block error rate/bit error rate of the logical channel is equal or close to the packet error rate/the block error rate/the bit error rate required by the allocated radio resources; alternatively, the maximum allowable packet error rate/block error rate/bit error rate of the logical channel is close to or belongs to the packet error rate/block error rate/bit error rate range required by the allocated radio resources.

When one RLC SDU in the LCH data to be transmitted can be born completely in the remaining resources, the UE should not segment the RLC SDU to transmit (that is, do not allocate resources to a part of the data of the SDU in this resources allocation);

if the UE segments one RLC SDU, it should utilize the remaining resources to bear a segment of data in the RLC SDU as large as possible;

the UE should maximize the amount of data transmission.

Figure 2:
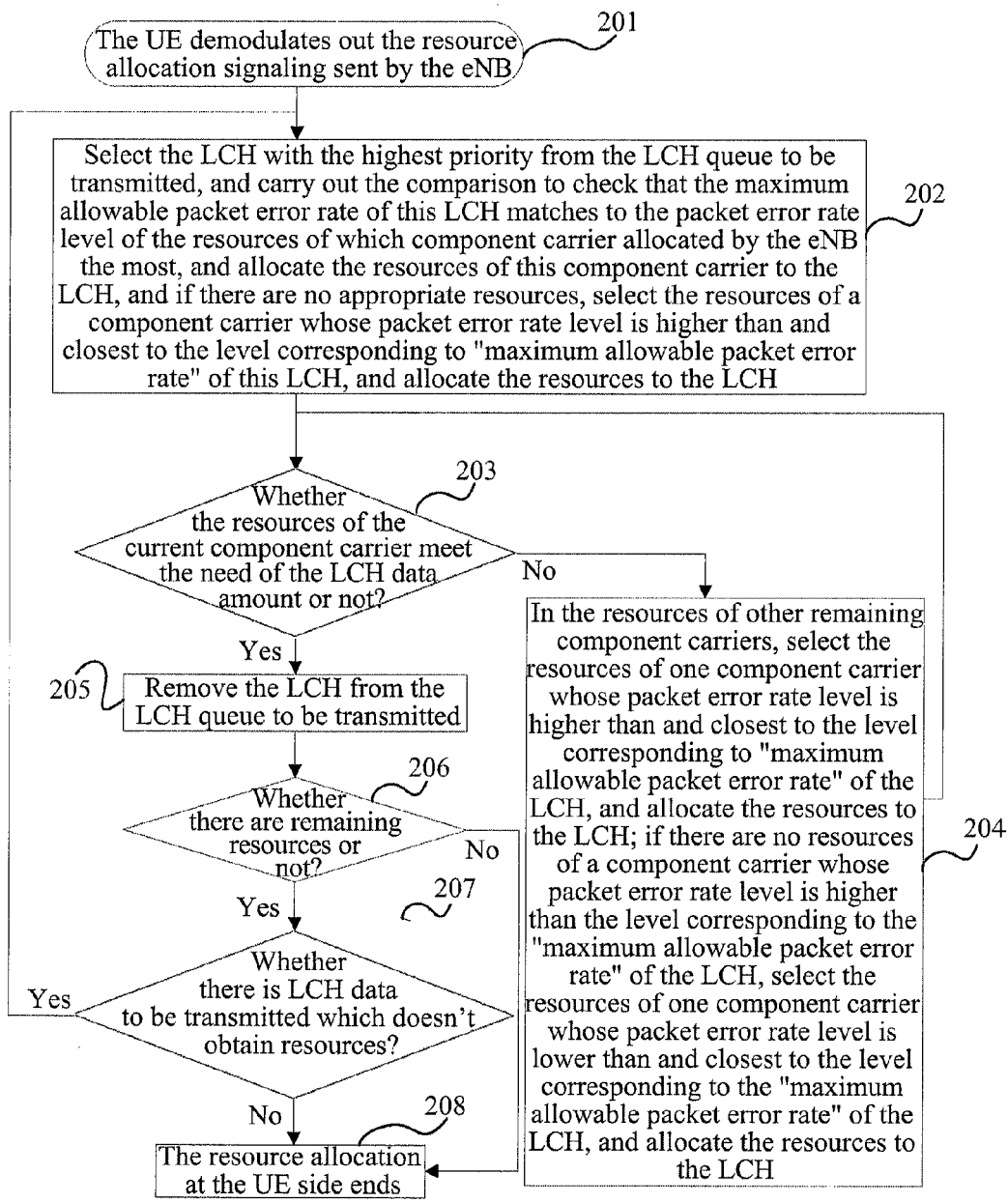
FIG. 2 is a flow chart of the second example of method for scheduling uplink radio resources in the wireless communication system in accordance with the present invention.

FIG. 2 is a flow chart of the second example of method for scheduling uplink radio resources in a wireless communication system in accordance with the present invention, the information of "packet error rate level" is added in the radio resource allocation control signaling sent by eNB in this example, levels of packet error rate are realized from the perspective of saving the signaling overhead; one principle of logical channel priority processing at the UE side is added, since packet error rate level directly corresponds to the QoS index of logical channels in the UE, the packet error rate level can be used as one item of effective reference information to guide the UE to allocate appropriate resources according to the QoS index.

The packet error rate level table is set in the LTE-Advanced standard, as shown in Table 1:

TABLE 1

| Packet error rate level | Corresponding packet error rate range |
|---|---|
| 1 | [0.01%, 0.1%) |
| 2 | [0.1%, 0.5%) |
| 3 | [0.5%, 1%) |
| 4 | [1%, 2%) |

The table content has been preset in the eNB and the UE.

Assume that in a certain scheduling, the uplink radio resources and its control signaling information content allocated by the eNB to the UE are that:

in the component carrier 1, allocate resources of four RBs, MCS=21, and the packet error rate level is 1;

in the component carrier 2, allocate resources of four RBs, MCS=10, and the packet error rate level is 4;

in the component carrier 3, allocate resources of four RBs, MCS=18, and the packet error rate level is 2;

The definition domain of "packet error rate level" is included in the aforementioned radio resource allocation control signaling.

Assuming that there are two LCH data at the UE side to be transmitted, wherein LCH1 is VoIP service data, and LCH2 is FTP service data, and the LCH1 priority>the LCH2 priority, and the maximum allowable packet error rate of the LCH1>the maximum allowable packet error rate of the LCH2. The data to be transmitted in the LCH1 is 320 bit while the data to be transmitted in the LCH2 is 4 Mbit. Assume that the maximum allowable packet error rate of the VoIP service is 2% and the maximum allowable packet error rate of the FTP service is 0.1%.

According to the definition in the LTE standard (3GPP TS36.213), the aforementioned scenario setting can be acquired by looking up tables: the resources of the component carrier 1 allocated by the eNB to the UE can bear 1736 bit data, the resources of the component carrier 2 can bear 680 bit data, and the resources of the component carrier 3 can bear 1416 bit data.

According to the packet error rate level table defined in this example, it can be looked up that the packet error rate level of the LCH1 is 4 and that of the LCH2 is 1.

As shown in FIG. 2, in this example, the method for scheduling uplink radio resources comprises the following steps:

Step 201: the UE demodulates out the resource allocation signaling sent by the eNB;

Step 202: select the LCH with the highest priority from the LCH queue to be transmitted, and make a comparison to check that the packet error rate level of this LCH matches to the packet error rate level of the resources of which component carrier allocated by the eNB the most, and allocate the resources of this component carrier to the LCH, and if there are no appropriate resources, in order to guarantee the transmission quality of the LCH, select the resources of one component carrier whose packet error rate level is higher than and closest to the packet error rate level of this LCH (that is, the packet error rate corresponding to this level should be lower than the "maximum allowable packet error rate" of the LCH), and allocate the resources to the LCH. In accordance with the scenario data set in this example, the LCH1 has the highest priority, and the most appropriate resources for the LCH 1 are the resources of the component carrier 2.

Step 203: judge whether the resources of the current component carrier meets the need of the LCH data amount or not, and if yes, proceed to step 205; otherwise, proceed to step 204. In accordance with the scenario data set in this example, the component carrier 2 can meet the requirements of the LCH1, thus proceed to step 205.

Step 204: in the resources of other remaining component carriers, select the resources of one component carrier whose packet error rate level is higher than and close to the level corresponding to the "maximum allowable packet error rate" of the LCH, and allocate the resources to the LCH; if there are no resources of a component carrier whose packet error rate level is higher than the level corresponding to the "maximum allowable packet error rate" of the LCH, select the resources of one component carrier whose packet error rate level is lower than and closest to the level corresponding to the "maximum allowable packet error rate" of the LCH, and allocate the resources to the LCH.

Step 205: remove the LCH from the LCH queue to be transmitted;

Step 206: judge whether there are remaining resources or not, and if yes, proceed to step 207; otherwise proceed to step 208, the resource allocation at the UE side ends.

Step 207: judge whether there are LCH data to be transmitted which don't obtain resources or not, and if yes, return to step 202; otherwise, proceed to step 208, and the resource allocation at the UE side ends. In accordance with the scenario data set in this example, the LCH2 doesn't obtain resources yet, thus return to step 202. The packet error rate level of the LCH2 is 1, and the resources of the component carrier 1 can meet the requirements of the LCH2 the most, thus allocate the resources of the component carrier 1 to the LCH2; moreover, since the resources of the component carrier 1 are insufficient to meet the LCH2 and only the resources of the component carrier 3 in the remaining resources are closest to the requirements of the LCH2, allocate the resources of the component carrier 3 to the LCH2; moreover, since the resources of the component carrier 3 is still not enough to bear the LCH2 and only the resources of the component carrier 2 in the remaining resources are closest to the requirements of the LCH2, and there is a surplus after allocating the resources of the component carrier 2 to the LCH1, allocate the remaining resources of the component carrier 2 to the LCH2.

Step 208: the resource allocation at the UE side ends.

In this example, directly take the packet error rate required by the radio resources as the control signaling information and send it to the UE, and the UE selects a LCH with appropriate packet error rate requirement for radio resources according to the aforementioned principles. If the control signaling information is the block error bit, the bit error rate or other information, the implementation method is the same as the method shown in FIG. 2, and is not repeated here.

The Third Example

The implementation method of this example is basically the same as that of the second example, and the control signaling information is still the packet error rate, the block error rate, the bit error rate and so on, and only the MCS is used to indicate the control signaling information, thus the control signaling overhead is further reduced. The specific implementation is as follows:

Setting the corresponding relationship table between the MCS level and the packet error rate, as shown in Table 2:

TABLE 2

| MCS level | Packet error rate level | Corresponding packet error rate range |
| --- | --- | --- |
| 0~10 | 4 | [1%, 2%) |
| 11~20 | 3 | [0.5%, 1%) |
| 21~24 | 2 | [0.1%, 0.5%) |
| 25~28 | 1 | [0.01%, 0.1%) |
| 29 | Reserved | Reserved |
| 30 | Reserved | Reserved |
| 31 | Reserved | Reserved |

In Table 2, the MCS level range defined in the existing LTE standard is from 0 to 31 (see 3GPP TS36.213 Table 8.6.1-1), and refer to Table 2 to define the corresponding relationship between the MCS level and the packet error rate. The packet error rate range corresponding to each packet error rate level should be specified according to the packet error rate requirements of different service types, and the optimal value is determined according to the actual system experiments and system simulations.

Table 2 has two use methods: at first, predefine the table 2 in the eNB and the UE, and the eNB and the UE conform to this definition together, thus it does not need to exchange signaling between the eNB and the UE in order to transmit the table; secondly, predefine this table at the eNB side, and the content of the table can be semi-statically configured by the eNB, and do not predefine this table for the UE, and the content of the table is sent by the eNB to the UE via a dedicated signaling. The above table is only one of the methods for defining the corresponding table of the MCS level and the packet error rate, and there might be other different definition methods and formats, such as a different order, ascending or descending order, different segmentation granularity for the packet error rate range and the MCS level, and different segmentation levels for the packet error rate and the MCS level.

The principle which processing the logical channel priority at the UE side is based on is the same as that in the second example.

This example establishes the corresponding relationship between the MCS level and the packet error rate index, and the table is fixedly defined in the protocol and both the eNB and the UE conform to the table together; alternatively, the eNB semi-statically configures the corresponding relationship and notifies the UE via signaling; and principle for processing the logical channel priority at the UE side is added, since a corresponding relationship is established between the MCS level and the index of packet error rate, the MCS level can be used as one item of effective reference information to guide the UE allocating appropriate resources according to the QoS index, and there is no need to add information into the radio resource allocation control signaling sent by the eNB.

The Fourth Example

The eNB allocates radio resources to the UE according to the uplink channel quality information and the current logical channel information of the UE, and determines the control signaling information for the allocated radio resources, and notifies the control signaling information of the radio resources to the UE. If the control signaling information of the radio resources comprises the signal to noise ratio (SNR), the signal to interference noise ratio (SINR), or level information thereof, the process of logical channel priority processing at the UE side is executed by the following steps:

allocate the radio resources in turn to a logical channel that has data to be transmitted and whose average data flow does not meet the prioritized bit rate (PRB) requirement of this logical channel according to the descending order of the priorities of the logical channel.

When there are remaining resources, the remaining resources are allocated in turn to logical channels having data to be transmitted according to the descending order of the priorities of the logical channel, and logical channels with the same priority have equal opportunities to acquire radio resources.

The principles which should be obeyed when executing the abovementioned steps comprise that:

allocate the radio resources of the component carrier having higher SNR or SINR to a logical channel having higher requirements of index of the packet error rate/block error rate/bit error rate, alternatively, allocate the radio resources of the component carrier having higher SNR level or SINR level to a logical channel having higher requirements of index of the packet error rate/block error rate/bit error rate.

When one RLC SDU in the LCH data to be transmitted can be born completely in the remaining resources, the UE should not segment the RLC SDU to transmit (that is, do not allocate resources to a part of the data of the SDU in this resource allocation);

if the UE segments one RLC SDU, it should utilize the remaining resources to bear a segment of data in the RLC SDU as large as possible;

the UE should maximize the amount of data transmission.

Figure 3:
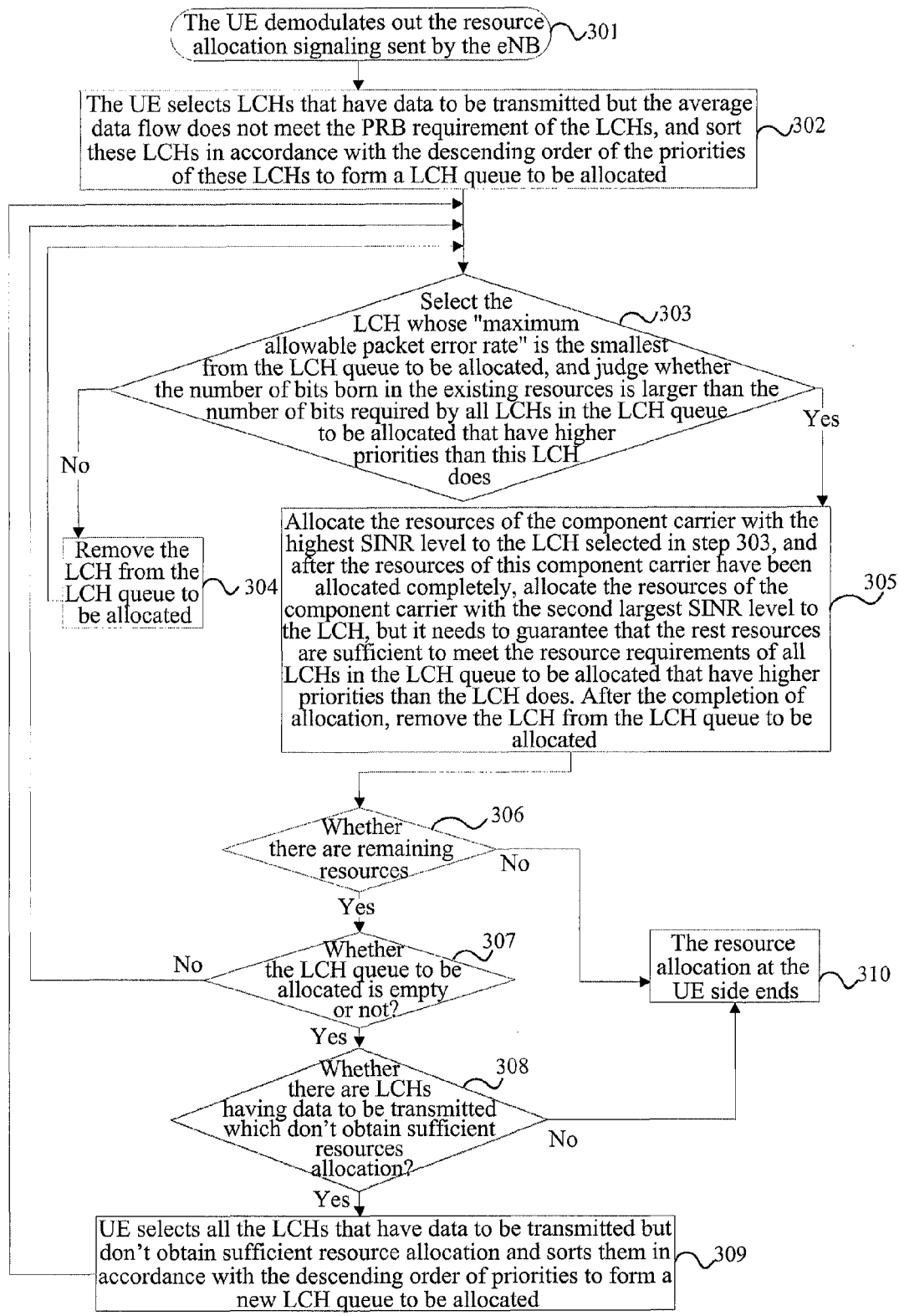
FIG. 3 is a flow chart of the fourth example of method for scheduling uplink radio resources in the wireless communication system in accordance with the present invention.

FIG. 3 is a flow chart of the second example of method for scheduling uplink radio resources in a wireless communication system in accordance with the present invention, and in this example, take the control signaling information as the SINR level to carry out illustration for example, and the SINR level table is set in the LTE-Advanced standard, as shown in Table 3:

TABLE 3

| SINR level | Corresponding SINR range |
| --- | --- |
| 0 | [−8 dB, −5 dB) |
| 1 | [−5 dB, −2 dB) |
| 2 | [−2 dB, 1 dB) |
| 3 | [1 dB, 4 dB) |
| 4 | [4 dB, 7 dB) |
| 5 | [7 dB, 10 dB) |
| 6 | [10 dB, 13 dB) |
| 7 | [13 dB, 16 dB) |

The content of Table 3 is predefined in both the eNB and the UE, and in this example, the important information "SINR level" is added in the radio resource allocation control signaling sent by the eNB, and levels of the SINR are realized from perspective of saving the signaling overhead; adds one principle of logical channel priority processing at the UE side, and since the SINR level has a strong correlation with the QoS index of the logical channels in the UE, the SINR level can be used as one item of effective reference information to guide the UE to allocate appropriate resources according to the QoS index.

Assume that in a certain scheduling, the uplink radio resource and its control signaling information content allocated by the eNB to the UE are that:

in the component carrier 1, allocate resources of four RBs, MCS=21, and the SINR level is 6;

in the component carrier 2, allocate resources of four RBs, MCS=10, and the SINR level is 2;

in the component carrier 3, allocate resources of four RBs, MCS=18, and the SINR level is 5;

the definition domain of "SINR level" is included in the radio resource allocation control signaling.

Assuming that there are two LCH data to be transmitted at the UE side, wherein the LCH1 is VoIP service data, and the LCH2 is FTP service data, the LCH1 priority>the LCH2 priority, and the maximum allowable packet error rate of the LCH1>the maximum allowable packet error rate of the LCH2. The data to be transmitted in the LCH1 is 320 bit, while the data to be transmitted in the LCH2 is 4 Mbit. Assume that the maximum allowable packet error rate of the VoIP service is 2% and the maximum allowable packet error rate of the FTP service is 0.1% in the QoS parameter configuration. According to the definition in the LTE standard (3GPP TS36.213), the aforementioned scenario setting can be acquired by looking up tables: the resources of the component carrier 1 allocated by the eNB to the UE can bear 1736 bit data, the resources of the component carrier 2 can bear 680 bit data, and the resources of the component carrier 3 can bear 1416 bit data.

As shown in FIG. 3, in this example, the method for scheduling uplink radio resources comprises the following steps:

Step 301: the UE demodulates out the resource allocation signaling sent by the eNB;

Step 302: the UE selects LCHs that have data to be transmitted but the average data flow does not meet the PRB requirement of the LCHs, and sort these LCHs in accordance with the descending order of the priorities of these LCHs to form a LCH queue to be allocated;

Step 303: select the LCH whose "the maximum allowable packet error rate" is the smallest from the LCH queue to be allocated, and judge whether the number of bits born in the existing resources is larger than the number of bits required by all LCHs that have higher priorities than this LCH does in the LCH queue to be allocated; and if yes, it means there are extra resources that can be allocated to the LCH, and proceed to step 305; otherwise, there are no extra resources to be allocated to the LCH, proceed to step 304. In accordance with the scenario data set in this example, the LCH whose "the maximum allowable packet error rate" is the smallest is the LCH2, and the number of bits to be transmitted in all LCHs that have higher priorities than the LCH2 is 320 bit, and the existing resources can bear 3832 bit, 3832−320>0, thus execute step 305.

Step 304: since there are no extra resources to be allocated to the LCH selected in step 303, thus the UE does not allocate resources to the LCH in this resource allocation and remove the LCH from the LCH queue to be allocated, return to step 303;

Step 305: allocate the resources of the component carrier with the highest SINR level to the LCH selected in step 303, and after the resources of this component carrier have been allocated completely, allocate the resources of the component carrier with the second largest SINR level to the LCH, but it needs to guarantee that the remaining resources are sufficient to meet the resource requirements of all LCHs that have higher priorities than the LCH does in the LCH queue to be allocated. After the completion of allocation, remove the LCH from the LCH queue to be allocated; in accordance with the scenario data set in this example, the resources of the component carrier 1 has the highest SINR level, thus its resources will be allocated to the LCH2, and since the data to be transmitted in the LCH2 is 4 Mbit which is larger than the resource bearing capacity of the component carrier 1, the resources of the component carrier 3 with the second highest SINR level should be allocated to the LCH2; moreover, since the remaining data to be transmitted in the LCH2=4 Mbit— the resource bearing capacity of the component carrier 1>the resource bearing capacity of the component carrier 2, therefore, it also needs to allocate resources of the component carrier 2 having the next highest SINR level to the LCH2; considering that it needs to guarantee to meet the resource requirements of the LCH1 with high priority, only 680−320=360 bit in the resources of the component carrier 2 are allocated to LCH2, and a total of 1736+1416+360=3512 bit of resources are finally allocated to the LCH2 in this scheduling.

Step 306: judge whether the resources allocated by the eNB have a surplus or not; if yes, proceed to step 307; otherwise, the resource allocation at the UE side ends. In accordance with scenario data set in this example, the resources allocated by the eNB have no surplus, thus the resource allocation at the UE side ends.

Step 307: judge whether the LCH queue to be allocated is empty or not, and if no, return to step 303; otherwise, proceed to step 308;

Step 308: judge whether there are LCHs that have data to be transmitted but don't obtain sufficient resources allocation, and if no, proceed to step 309; otherwise, the resource allocation at the UE side ends;

Step 309: If there are LCHs that have data to be transmitted but don't obtain sufficient resources allocation at the UE side, select these LCHs and sort them in accordance with the descending order of priorities to form a new LCH queue to be allocated, return to Step 303;

Step 310: the resource allocation at the UE side ends.

In this example, the control signaling information can also be the SNR and level information thereof, and its implementation method is the same as that shown in FIG. 3 and is not repeated here.

The Fifth Example

The eNB allocates radio resources to the UE according to the uplink channel quality information and the current logical channel information of the UE, and determines the control signaling information for the allocated radio resources, and notifies the control signaling information of the radio resources to the UE. If the control signaling information of the radio resources comprises the LCH identification such as the LCH sequence number information, the process of logical channel priority processing at the UE side is executed by the following steps:

allocate the radio resources to a corresponding logical channel that has data to be transmitted and whose average data flow does not meet the prioritized bit rate (PRB) requirement of this logical channel according to the corresponding logical channel identification information; wherein, the logical channel identification information comprises at least one of types of the logical channel sequence number information and logical channel group sequence number information;

when the radio resources in the same component carrier are assigned by the eNB to at least two logical channels, allocate the radio resources in turn to logical channels whose average data flow does not meet the PRB requirements of these logical channels according to the descending order of the priorities of the logical channels;

when there are remaining resources, the remaining resources are allocated in turn to logical channels having data to be transmitted according to the descending order of the priorities of the logical channels, and logical channels having the same priority have equal opportunities to acquire radio resources.

In this example, the intuitive information "logical channel sequence number" is added in the radio resource allocation control signaling sent by the eNB. Completely modify the principles for processing the logical channel priority at the UE side, and the UE allocates resources in accordance with the "logical channel sequence number" sent by the eNB totally, thus to guarantee that the scheduling strategy of the eNB can be executed accurately at the UE side.

Figure 4:
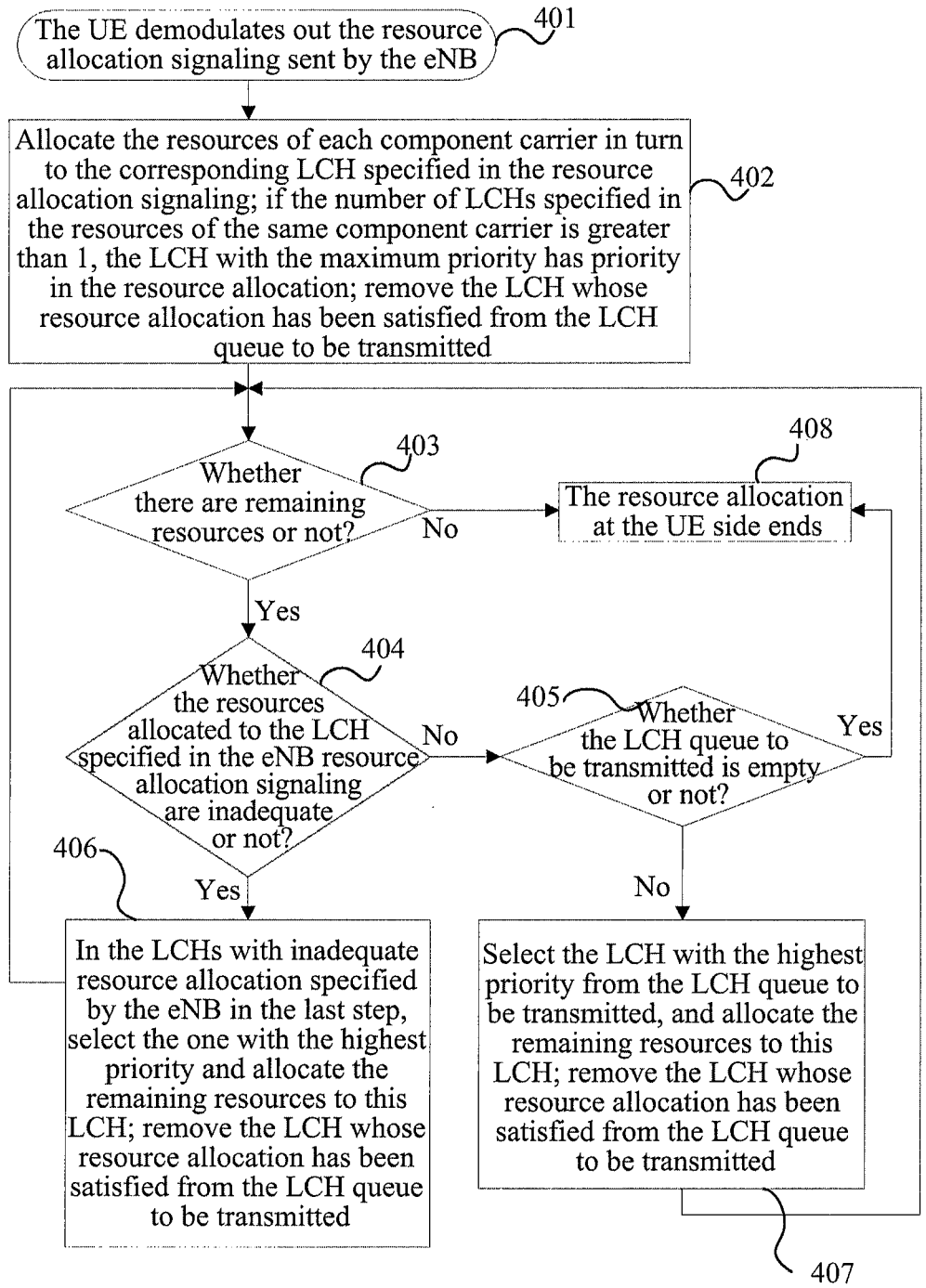
FIG. 4 is a flow chart of the fifth example of method for scheduling uplink radio resources in the wireless communication system in accordance with the present invention.

FIG. 4 is a flow chart of the fifth example of method for scheduling the uplink radio resources in the wireless communication system in the present invention, and assume that in a certain scheduling, the uplink radio resources and its control signaling information content allocated by the eNB to the UE are: in the component carrier 1, allocate resources of four RBs, MCS=21, and the LCH sequence number is "LCH2"; in the component carrier 2, allocate resources of four RBs, MCS=10, and the LCH sequence number is "LCH1, LCH2"; in the component carrier 3, allocate resources of four RBs, MCS=18, and the LCH sequence number is "LCH2";

the definition domain of "LCH sequence number" is included in the radio resource allocation control signaling.

Assuming there are two LCH data at the UE side to be transmitted, wherein the LCH1 is VoIP service data, and the LCH2 is FTP service data, the LCH1 priority>the LCH2 priority, and the maximum allowable packet error rate of the LCH1>the maximum allowable packet error rate of the LCH2. The data to be transmitted in the LCH1 is 320 bit, and the data to be transmitted in the LCH2 is 4 Mbit. Assume that the maximum allowable packet error rate of the VoIP service is 2% and the maximum allowable packet error rate of the FTP service is 0.1% in the QoS parameter configuration. According to the definition in the LTE standard (3GPP TS36.213), the aforementioned scenario setting can be acquired by looking up tables: the resources of the component carrier 1 allocated by the eNB to the UE can bear 1736 bit data, the resources of the component carrier 2 can bear 680 bit data, and the resources of the component carrier 3 can bear 1416 bit data.

As shown in FIG. 4, in this example, the method for scheduling uplink radio resources comprises the following steps:

Step 401: the UE demodulates out the resource allocation signaling sent by the eNB;

Step 402: allocate the resources of each component carrier in turn to the corresponding LCH specified in the resource allocation signaling; if the number of LCHs specified in the resources of the same component carrier is greater than 1, it has priority to allocate the resources to the LCH with the maximum priority; remove the LCH whose resources allocation is satisfied from the LCH queue to be transmitted. In accordance with the scenario data set in this example, all the resources of the component carrier 1 are allocated completely to LCH2, 320 bit resources of the component carrier 2 are allocated to LCH1, the remaining 360 bit resources are allocated to the LCH2, and all the resources of the components carrier 3 are allocated to the LCH2.

Step 403: judge whether there are remaining resources or not, and if yes, proceed to step 404; otherwise, proceed to step 408, the resource allocation at the UE side ends. in accordance with the scenario data set in this example, there are no remaining resources, and the resource allocation at the UE side ends.

Step 404: judge whether the resources allocated to the LCH specified in the eNB resource allocation signaling is inadequate or not; if yes, proceed to step 406; otherwise, proceed to step 405.

Step 405: judge whether the LCH queue to be transmitted is empty or not? If yes, proceed to step 408, the resource allocation at the UE side ends; otherwise, proceed to step 407.

Step 406: in the LCHs which are designated by the eNB and obtain inadequate resources in step 405, select the one with the highest priority and allocate the remaining resources to this LCH; remove the LCH whose resources allocation is satisfied from the LCH queue to be transmitted; returns to step 403.

Step 407: select one LCH with the highest priority from the LCH queue to be transmitted, and allocate the remaining resources to this LCH; remove the LCH whose resources allocation is satisfied from the LCH queue to be transmitted; returns to step 403.

Step 408: the resource allocation at the UE side ends.

The Sixth Example

The eNB allocates radio resources to the UE according to the uplink channel quality information and the current logical channel information of the UE, and determines the control signaling information for the allocated radio resources, and notifies the control signaling information of the radio resources to the UE. If the control signaling information of the radio resources comprises the LCH priority information corresponding to the radio resources, the process of logical channel priority processing at the UE side is executed by the following steps:

allocate the radio resources in turn to a logical channel that has data to be transmitted and whose average data flow does not meet the prioritized bit rate (PRB) requirement of this logical channel according to the descending order of the priorities of the logical channel;

When there are remaining resources, the remaining resources are allocated in turn to logical channels having data to be transmitted according to the descending order of the priorities of the logical channel, and logical channels with the same priority have equal opportunities to acquire radio resources.

The principles that should be obeyed when executing the abovementioned steps comprise that:

allocate the radio resources to a logical channel whose priority is equal to or closest to the priority of the corresponding logical channel according to logical channel priority information corresponding to radio resources;

when one RLC SDU in the LCH data to be transmitted can be born completely in the remaining resources, the UE should not segment the RLC SDU to transmit (that is, do not allocate resources to a part of the data of the SDU in this resource allocation);

if the UE segments one RLC SDU, it should utilize the remaining resources to bear a segment of data in the RLC SDU as large as possible;

the UE should maximize the amount of data transmission.

In this example, the intuitive information "logical channel priority" is added in the radio resource allocation control signaling sent by the eNB. Completely modify the principles for processing the logical channel priority at the UE side, and the UE allocates resources in accordance with the "logical channel priority" sent by the eNB totally, thus to guarantee that the scheduling strategy of the eNB can be executed accurately at the UE side.

Figure 5:
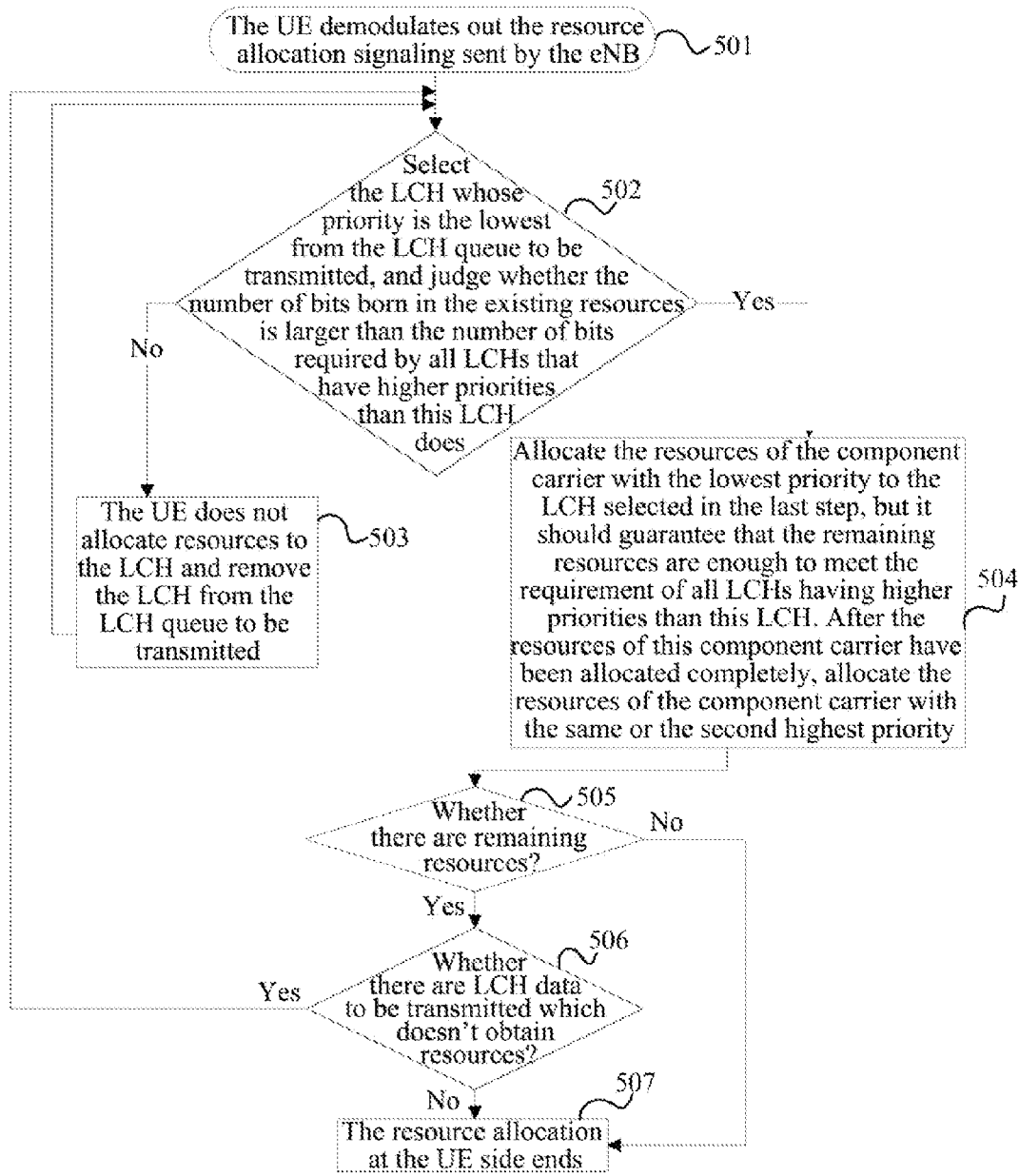
FIG. 5 is a flow chart of the sixth example of method for scheduling uplink radio resources in the wireless communication system in accordance with the present invention.

FIG. 5 is a flow chart of the sixth example of method for scheduling the uplink radio resources in the wireless communication system in the present invention, and assume that in a certain scheduling, the uplink radio resources and its control signaling information content allocated by the eNB to the UE are: in the component carrier 1, allocate resources of four RBs, MCS=21, and the corresponding LCH priority is 1; in the component carrier 2, allocate resources of four RBs, MCS=10, and the corresponding LCH priority is 8; in the component carrier 3, allocate resources of four RBs, MCS=18, and the corresponding LCH priority is 3;

the definition domain of "LCH priority" is included in the radio resource allocation control signaling; assume that the higher the priority number is, the higher the priority is.

Assuming that there are two LCH data to be transmitted at the UE side, wherein the LCH1 is VoIP service data and the LCH2 is FTP service data, the priority of the LCH1 is 8 and the priority of the LCH2 is 1, and the maximum allowable packet error rate of the LCH1>the maximum allowable packet error rate of the LCH2. The data to be transmitted in the LCH1 is 320 bit, and the data to be transmitted in the LCH2 is 4 Mbit. Assume that the maximum allowable packet error rate of the VoIP service is 2% and the maximum allowable packet error rate of the FTP service is 0.1% in the QoS parameter configuration. According to the definition in the LTE standard (3GPP TS36.213), the aforementioned scenario setting can be acquired by looking up tables: the resources of the component carrier 1 allocated by the eNB to the UE can bear 1736 bit data, the resources of the component carrier 2 can bear 680 bit data, and the resources of the component carrier 3 can bear 1416 bit data.

As shown in FIG. 5, in this example, the method for scheduling uplink radio resources comprises the following steps:

Step 501: the UE demodulates out the resource allocation signaling sent by the eNB;

Step 502: select the LCH whose priority is the lowest from the LCH queue to be transmitted, and judge whether the number of bits born in the existing resources is larger than the number of bits required by all LCHs that have higher priorities than this LCH does, and if yes, it means there are extra resources that can be allocated to the LCH, and proceed to step 504; otherwise, proceed to step 503. In accordance with the scenario data set in this example, the LCH whose priority is the lowest is the LCH2, and the existing resources can bear 3832 bit, 3832>320, thus proceed to step 504.

Step 503: since there are no extra resources to be allocated to the LCH selected in step 502, the UE does not allocate resources to the LCH in this resource allocation and remove the LCH from the LCH queue to be transmitted, and return to step 502;

Step 504: allocate the resources of the component carrier with the lowest priority to the LCH selected in the last step, but it should guarantee that the remaining resources are enough to meet the requirements of all LCHs having higher priorities than this LCH does. After the resources of this component carrier have been allocated completely, allocate the resources of the component carrier with the same or the second highest priority, and so on. After the resources have been allocated completely, remove the LCH from the LCH queue to be transmitted; in accordance with the scenario data set in this example, the LCH priority of the resources of the component carrier 1 is the lowest, thus its resources will be allocated to the LCH2, and since the data to be transmitted in the LCH2 is 4 Mbit which is larger than the resource bearing capacity of the component carrier 1, the resources of the component carrier 3 with the second lowest priority of LCH are also allocated to the LCH2; moreover, since the resources of the component carrier 3 cannot meet the needs of the LCH2, the resources of the component carrier 2 with the highest priority of LCH are also allocated to the LCH2. Since it needs to guarantee to meet the resource requirements of the LCH1 with high priority, only 680−320=360 bit in the resources of the component carrier 2 are allocated to the LCH2, and a total of 1736+1416+360=3512 bit of resources are allocated to the LCH2.

Step 505: judge whether the resources allocated by the eNB have a surplus or not; if yes, proceed to step 506; otherwise, proceed to step 507, and the resource allocation at the UE side ends. In accordance with scenario data set in this example, the resources allocated by the eNB have no surplus, thus the resource allocation at the UE side ends.

Step 506: judge whether there are the LCH data to be transmitted which don't obtain resources, and if yes, proceed to step 502; otherwise, the resource allocation at the UE side ends;

Step 507: the resource allocation at the UE side ends.

The Seventh Example

The implementation method of this example is basically the same as that of the fourth example, that is, set the corresponding relationship table between the MCS and the SINR, and use the MCS to indicate the SINR level of the radio resources in this component carrier so as to save the signaling overhead, and the corresponding relationship table between the MCS and the SINR is shown in Table 4:

TABLE 4

| MCS level | SINR level | Corresponding packet error rate range |
|---|---|---|
| 0~10 | 0 | [−8 dB, −2 dB) |
| 11~20 | 1 | [−2 dB, 4 dB) |
| 21~24 | 2 | [4 dB, 10 dB) |
| 25~28 | 3 | [10 dB, 16 dB) |
| 29 | Reserved | Reserved |
| 30 | Reserved | Reserved |
| 31 | Reserved | Reserved |

The content of Table 4 is predefined in both the eNB and the UE, and one definition domain "logical channel priority" is added in the radio resource allocation control signaling sent by the eNB, and this definition domain is used to notify the UE that the eNB hopes to allocate the resources of the component carrier to logical channels with which priorities.

The principles for processing the logical channel priority at the UE side are totally the same as those shown in the example.

In this example, the intuitive information "logical channel priority" is added in the radio resource allocation control signaling sent by the eNB; establish a corresponding relationship between the MCS level and the SINR index, or fixedly define this table in the protocol, and both the eNB and the UE conform to this table; alternatively, the eNB semi-statically configures the corresponding relationship and notifies the UE via signaling; modify the principles for processing the logical channel priority at the UE side, and the UE allocates resources in accordance with two types of combination information of the "logical channel priority" sent by eNB totally and the corresponding relationship between the MCS level and the SINR index, thus to guarantee that the scheduling strategy of the eNB can be executed accurately at the UE side.

Figure 6:
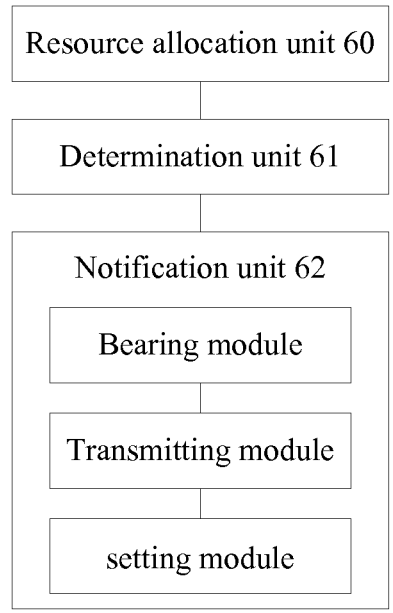
FIG. 6 is a schematic diagram of the composition structure of the first example of apparatus for scheduling uplink radio resources in the wireless communication system in accordance with the present invention.

FIG. 6 is a schematic diagram of the composition structure of the first example of apparatus for scheduling the uplink radio resources in the wireless communication system in accordance with the present invention, and as shown in FIG. 6, the apparatus for scheduling the uplink radio resources in the wireless communication system in accordance with the present invention comprises the resource allocation unit 60, the determination unit 61 and the notification unit 62; wherein, the resource allocation unit 60 is used to allocate radio resources to the UE according to the uplink channel quality information and the current logical channel information of the UE. The determination unit 61 is used to determine the control signaling information of the radio resources; the notification unit 62 is used to notify the control signaling information of the radio resources to the UE. The control signaling information of the radio resources comprises at least one of types of the following information: parameter information related to quality of service of the radio resources, parameter information related to the quality of the uplink channel in which the radio resources are located, and parameter information related to logical channel of the UE corresponding to the radio resources. The parameter information related to the quality of service of the radio resources comprises: at least one of types of the packet error rate information, the block error rate information and the bit error rate information; the parameter information related to the quality of the uplink channel in which the radio resources are located comprises at least one of types of signal to interference noise ratio information or signal to noise ratio information; the parameter information related to the logical channel of the UE corresponding to the radio resources comprises at least logical channel sequence number information, logical channel group sequence number information, logical channel priority information, logical channel aggregate maximum bit rate information, logical channel prioritized rate information and the logical channel maximum allowable delay information.

The structure of said notification unit 62 comprises a bearing module and a transmitting module; wherein, the bearing module is used to bear the control signaling information of said radio resources in a control signaling, a dedicated signaling, or a dedicated MAC control unit; the transmitting module is used to transmit the control signaling information of the radio resources to said UE.

The structure of said notification unit 62 further comprises a setting module and a transmitting module; wherein, the setting module is used to set the identification information of the control signaling information of the radio resources; the transmitting module is used to transmit the identification information to the UE.

The structure of said notification unit 62 further comprises a setting module and a notification module; wherein, the setting module is used to set the corresponding relationship between the information in the uplink grant message, the RRC message or the dedicated MAC control unit and the control signaling information of the radio resources; the notification module is used to send the corresponding relationship to the UE or store the corresponding relationship into the eNB and the UE in advance.

Those skilled in the field should understand that the apparatus for scheduling uplink radio resources shown in FIG. 6 can be used at the eNB side, and the implementation function of each processing unit can be understood with reference to the related description from the first example to the seventh example. The function of each unit in the apparatus for scheduling uplink radio resources shown in FIG. 6 can be implemented with program running in the processor or with a specific logic circuit.

Figure 7:
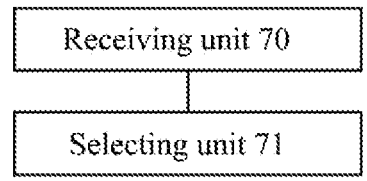
FIG. 7 is a schematic diagram of the composition structure of the second example of apparatus for scheduling uplink radio resources in the wireless communication system in accordance with the present invention.

FIG. 7 is a schematic diagram of the composition structure of the first example of apparatus for scheduling the uplink radio resources in the wireless communication system in accordance with the present invention, and as shown in FIG. 7, the apparatus for scheduling the uplink radio resources in the wireless communication system in accordance with the present invention comprises the receiving unit 70 and the selecting unit 71, wherein, the receiving unit 70 is used to receive the control signaling information of the radio resources sent by the eNB. The selecting unit 71 is used to select the corresponding radio resources for the logical channel according to the requirement of quality of service of the logical channel as well as the control signaling information of the radio resources. The principles for the selecting unit 71 selecting radio resources for the logical channel are different according to the control signaling information of the radio resources, and the principles can be referred to the related description from the first example to the seventh example.

Those skilled in the field should understand that the apparatus for scheduling uplink radio resources shown in FIG. 7 can be used at the UE side, the implementation function of each processing unit can be understood with reference to the related description from the first example to the seventh example. The function of each unit in the apparatus for scheduling uplink radio resources shown in FIG. 7 can be implemented with program running in the processor or with a specific logic circuit.

The above description is only preferred examples of the present invention rather than restrictions of the protection scope of the present invention.

What is claimed is:

1. A method for scheduling uplink radio resources in a wireless communication system, the method comprising:
   an evolved NodeB (eNB) allocating radio resources to user equipment (UE), determining control signaling information of the radio resources, and notifying the control signaling information of said radio resources to the UE;
   wherein, the control signaling information of the radio resources comprises at least one type of following information: parameter information related to quality of service of data born in the radio resources, parameter information related to quality of an uplink channel in which the radio resources are located, and parameter information related to logical channel of the UE corresponding to the radio resources;
   wherein the parameter information related to the quality of service of the data born in the radio resources comprises: at least one of types of packet error rate information, block error rate information and bit error rate information;
   the parameter information related to the quality of an uplink channel in which the radio resources are located comprises at least one of types of signal to interference noise ratio information and signal to noise ratio information; the parameter information related to the logical channel of the UE corresponding to the radio resources comprises at least one of types of logical channel sequence number information, logical channel group sequence number information, logical channel priority information, logical channel aggregate maximum bit rate information, logical channel prioritized rate information and logical channel maximum allowable delay information.

2. The method of claim 1, wherein the step of notifying the control signaling information of the radio resources to the UE specifically is:
   bearing the control signaling information of said radio resources in an uplink grant message, or a radio resource control (RRC) message, or a dedicated media access control (MAC) control element, and sending the control signaling information of said radio resources to the UE.

3. The method of claim 1, wherein the step of notifying the control signaling information of the radio resources to the UE specifically is:
   setting identification information of the control signaling information of the radio resources, and sending said identification information to the UE.

4. The method of claim 1, wherein the step of notifying the control signaling information of the radio resources to the UE specifically is:

setting a corresponding relationship between the control signaling information of said radio resources and information in an uplink grant message, or a radio resource control (RRC) message, or a dedicated media access control (MAC) control element, sending the corresponding relationship to the UE or storing the corresponding relationship in the eNB and the UE in advance.

5. A method for scheduling uplink radio resources in a wireless communication system, the method comprising:

after receiving control signaling information of radio resources sent by an evolved NodeB (eNB), user equipment (UE) selecting corresponding radio resources for a logical channel according to requirements of quality of service of the logical channel and the control signaling information of the radio resources, and said radio resources being allocated to the UE by the eNB.

6. The method of claim 5, wherein a principle which the UE selecting the corresponding radio resources for the logical channel is based on is:

allocating the radio resources of component carriers with higher Modulation and Coding Scheme (MCS) to the logical channel having higher requirements of index of packet error rate/block error rate/bit error rate.

7. The method of claim 5, wherein when the control signaling information of the radio resources sent by the eNB comprises information of a packet error rate/block error rate/bit error rate or level thereof, a principle which selecting the corresponding radio resources for the logical channel is based on is:

allocating said radio resources to the logical channel according to the packet error rate/block error rate/bit error rate of the radio resources or a packet error rate/block error rate/bit error rate range corresponding to a packet error rate/block error rate/bit error rate level, and a maximum allowable packet error rate/block error rate/bit error rate of the logical channel being equal or close to the packet error rate/block error rate/bit error rate required by the radio resources allocated by the eNB;

or, the maximum allowable packet error rate/block error rate/bit error rate of the logical channel being close to or belonging to the packet error rate/block error rate/bit error rate range required by the radio resources allocated by the eNB.

8. The method of claim 5, wherein when the control signaling information of the radio resources sent by the eNB comprises information of a signal to noise ratio or signal to noise ratio level or signal to interference noise ratio or signal to interference noise ratio level, a principle which selecting the corresponding radio resources for the logical channel is based on is:

allocating the radio resources of component carriers having a higher signal to noise ratio or signal to interference noise ratio to the logical channel having higher requirements of index of packet error rate/block error rate/bit error rate;

or, allocating the radio resources of component carriers having a higher signal to noise ratio level or signal to interference noise ratio level to the logical channel having higher requirements of the index of the packet error rate/block error rate/bit error rate.

9. The method of claim 7, wherein when the control signaling information of the radio resources sent by the eNB comprises logical channel identification information, a principle which selecting the corresponding radio resources for the logical channel is based on is:

allocating the radio resources to a corresponding logical channel which has data to be transmitted and average data flow does not meet a prioritized bit rate (PRB) requirement of this logical channel according to the logical channel identification information corresponding to the radio resources; wherein, the logical channel identification information comprises at least one of types of logical channel sequence number information and logical channel group sequence number information;

when the radio resources in a same component carrier are assigned by the eNB to at least two logical channels, allocating the radio resources in turn to logical channels whose average data flow does not meet the PRB requirements of the logical channels in accordance with a descending order of priorities of these logical channels;

when there are remaining resources, the remaining resources being allocated in turn to logical channels having data to be transmitted according to the descending order of the priorities of the logical channels; logical channels with a same priority having equal opportunities to acquire the radio resources.

10. The method of claim 5, wherein when the control signaling information of the radio resources sent by the eNB comprises an uplink channel quality detection result, a principle which selecting the corresponding radio resources for the logical channel is based on is:

allocating the radio resources of component carriers having better channel quality to the logical channel having higher requirements of index of packet error rate/block error rate/bit error rate.

11. The method of claim 5, wherein when the control signaling information of the radio resources sent by the eNB comprises logical channel priority information, a principle which selecting the corresponding radio resources for the logical channel is based on is:

according to the logical channel priority information corresponding to the radio resources, allocating the radio resources to a logical channel whose priority is equal or closest to a logical channel priority corresponding to the radio resources.

12. An apparatus for scheduling uplink radio resources in a wireless communication system, said apparatus comprising a resource allocation unit, a determination unit and a notification unit; wherein the resource allocation unit is to allocate radio resources to user equipment (UE);

the determination unit is to determine control signaling information of the radio resources; wherein, the control signaling information of the radio resources comprises at least one type of following information: parameter information related to quality of service of data born in the radio resources, parameter information related to quality of an uplink channel in which the radio resources are located, and parameter information related to logical channel of the UE corresponding to the radio resources; wherein, the parameter information related to the quality of service of the data born in the radio resources comprises: at least one of types of packet error rate information, block error rate information and bit error rate information; wherein, the parameter information related to the quality of an uplink channel in which the radio resources are located comprises at least one of types of signal to interference noise ratio information and signal to noise ratio information; the parameter information related to the logical channel of the UE corresponding to the radio resources comprises at least one of types of logical channel sequence number information, logical channel group sequence number information, logical channel priority information, logical channel aggregate maximum bit rate information, logical channel prioritized rate information and logical channel maximum allowable delay information the notification unit is to notify the control signaling information of the radio resources to the UE.

13. The apparatus of claim 12, wherein, said notification unit further comprises a bearing module and a transmitting module; wherein, the bearing module is to bear the control signaling information of said radio resources in an uplink grant message, a radio resource control (RRC) message, or a dedicated media access control (MAC) control element;

the transmitting module is to transmit the control signaling information of the radio resources to said UE.

14. The apparatus of claim 12, wherein, said notification unit further comprises a setting module and a transmitting module; wherein, the setting module is to set identification information of the control signaling information of the radio resources;

the transmitting module is to transmit the identification information to the UE.

15. The apparatus of claim 12, wherein, said notification unit further comprises a setting module and a notification module; wherein, the setting module is to set a corresponding relationship between information in an uplink grant message, a radio resource control (RRC) message or a dedicated media access control (MAC) control element and the control signaling information of the radio resources;

the notification module is to send the corresponding relationship to the UE or configure the corresponding relationship into an evolved NodeB and the UE in advance.

16. An apparatus for scheduling uplink radio resources in a wireless communication system, said apparatus comprising a receiving unit and a selecting unit; wherein, the receiving unit is to receive control signaling information of radio resources sent by an evolved NodeB (eNB), and said radio resources are allocated by the eNB to user equipment (UE);

the selecting unit is to select corresponding radio resources for a logical channel according to quality of service requirements of the logical channel and the control signaling information of the radio resources.

17. The apparatus of claim 16, wherein a principle which selecting the corresponding radio resources for the logical channel is based on is:

allocating the radio resources of component carriers with higher Modulation and Coding Scheme (MCS) to the logical channel having higher requirements of index of packet error rate/block error rate/bit error rate.

18. The apparatus of claim 16, wherein when the control signaling information of the radio resources received by the receiving unit comprises information of a packet error rate/block error rate/bit error rate or level thereof, a principle which selecting the corresponding radio resources for the logical channel is based on is:

allocating said radio resources to the logical channel according to the packet error rate/block error rate/bit error rate of the radio resources or a packet error rate/block error rate/bit error rate range corresponding to a packet error rate/block error rate/bit error rate level, and a maximum allowable packet error rate/block error rate/bit error rate of the logical channel being equal or close to the packet error rate/block error rate/bit error rate required by the radio resources allocated by the eNB; or, the maximum allowable packet error rate/block error rate/bit error rate of the logical channel being close to or belonging to the packet error rate/block error rate/bit error rate range required by the radio resources allocated by the eNB.

19. The apparatus of claim 16, wherein when the control signaling information of the radio resources received by the receiving unit comprises information of a signal to noise ratio or signal to noise ratio level or signal to interference noise ratio or signal to interference noise ratio level, a principle which selecting the corresponding radio resources for the logical channel is based on is:

allocating the radio resources of component carriers having a higher signal to noise ratio or signal to interference noise ratio to the logical channel having higher requirements of index of packet error rate/block error rate/bit error rate;

or, allocating the radio resources of component carriers having a higher signal to noise ratio level or signal to interference noise ratio level to the logical channel having higher requirements of the index of the packet error rate/block error rate/bit error rate.

20. The apparatus of claim 16, wherein when the control signaling information of the radio resources received by the receiving unit comprises logical channel identification information, a principle which selecting the corresponding radio resources for the logical channel is based on is:

allocating the radio resources to a corresponding logical channel which has data to be transmitted and average data flow does not meet a prioritized bit rate (PRB) requirement of this logical channel according to the logical channel identification information corresponding to the radio resources; wherein, the logical channel identification information comprises at least one of types of logical channel sequence number information and logical channel group sequence number information;

when the radio resources in a same component carrier are assigned by the eNB to at least two logical channels, allocating the radio resources in turn to logical channels whose average data flow does not meet the PRB requirements of the logical channels in accordance with a descending order of priorities of these logical channels;

when there are remaining resources, the remaining resources being allocated in turn to logical channels having data to be transmitted according to the descending order of the priorities of the logical channels; logical channels with a same priority having equal opportunities to acquire radio resources.

21. The apparatus of claim 16, wherein when the control signaling information of the radio resources received by the receiving unit comprises an uplink channel quality detection result, a principle which selecting the corresponding radio resources for the logical channel is based on is:

allocating the radio resources of component carriers having better channel quality to the logical channel having higher requirements of index of packet error rate/block error rate/bit error rate.

22. The apparatus of claim 16, wherein when the control signaling information of the radio resources received by the receiving unit comprises logical channel priority information, a principle which selecting the corresponding radio resources for the logical channel is based on is:

according to the logical channel priority information corresponding to the radio resources, allocating the radio resources to a logical channel whose priority is equal or closest to a logical channel priority corresponding to the radio resources.

* * * * *